(12) United States Patent
Takaki

(10) Patent No.: US 6,377,012 B1
(45) Date of Patent: Apr. 23, 2002

(54) SERVO SYSTEM CONTROLLER

(75) Inventor: Nobuyasu Takaki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/744,695

(22) PCT Filed: Dec. 3, 1998

(86) PCT No.: PCT/JP98/05463

§ 371 Date: Jan. 29, 2001

§ 102(e) Date: Jan. 29, 2001

(87) PCT Pub. No.: WO00/33147

PCT Pub. Date: Jun. 8, 2000

(51) Int. Cl.[7] .............................................. G05B 19/10

(52) U.S. Cl. ...................... 318/567; 318/560; 318/564; 318/568.1; 318/568.11; 318/568.13; 318/568.22; 318/568.23; 318/568.25; 318/632; 364/474.02; 364/474.11; 364/474.35

(58) Field of Search ................................. 318/560, 564, 318/568.1, 568.11, 568.13, 568.23, 568.22, 568.25, 632; 364/474.02, 474.11, 474.35

(56) References Cited

U.S. PATENT DOCUMENTS

| | | | |
|---|---|---|---|
| 4,988,934 A | * 1/1991 | Toyoda et al. | 318/568.15 |
| 5,038,090 A | * 8/1991 | Kawabata et al. | 318/721 |
| 5,049,796 A | * 9/1991 | Seraji | 318/568.1 |
| 5,194,790 A | * 3/1993 | Niimi | 318/567 |
| 5,250,886 A | * 10/1993 | Yasuhara et al. | 318/567 |
| 5,250,902 A | * 10/1993 | Uehara et al. | 318/599 |
| 5,369,345 A | * 11/1994 | Phan et al. | 318/561 |
| 5,656,906 A | * 8/1997 | Iwashita et al. | 318/568.23 |
| 5,760,562 A | * 6/1998 | Woodland et al. | 318/632 |
| 5,864,568 A | * 1/1999 | Nemazie | 371/40.14 |
| 5,963,003 A | * 10/1999 | Boyer | 318/574 |
| 6,037,738 A | * 3/2000 | Morita et al. | 318/625 |
| 6,081,090 A | * 6/2000 | Takaki et al. | 318/567 |

FOREIGN PATENT DOCUMENTS

| | | | |
|---|---|---|---|
| JP | 63-149709 | 6/1988 | G05D/3/12 |
| JP | 2-278302 | 11/1990 | G05B/19/05 |
| JP | 3-19003 | 1/1991 | G05B/19/05 |
| JP | 4-358204 | 12/1992 | G05B/19/05 |
| JP | 5-4215 | 1/1993 | G05D/3/10 |
| JP | 6-222827 | 8/1994 | G05B/19/42 |
| JP | 8-272420 | 10/1996 | G05B/19/4155 |

OTHER PUBLICATIONS

International Search Report.

* cited by examiner

Primary Examiner—Jeffrey Donels
Assistant Examiner—Tyrone Smith
(74) Attorney, Agent, or Firm—Sughrue Mion, PLLC

(57) ABSTRACT

A servo system controller which has a sequence controlling section 2 and a servo controlling section 3, employs not only a current position of a servo motor but also other servo control data or a sequencer device as comparison data, and executes a comparing process for compares whether or not respective comparison data are in respective detection ranges to then output respective comparison results, increase and variation of a response time can be prevented until the comparison results are output from the change of the comparison data. A comparing process table memory 14 is provided in the servo controlling section 3, and the comparing process is executed in synchronism with a calculation period of the servo controlling section 3, and a detection signal is output while the comparison data is within a detection range. In a machining apparatus utilizing the servo system controller, a tact time can be reduced without large increase of a cost. Also, if the increase and variation of a decision process time have an influence upon the machining precision, reduction in the machining precision can be prevented.

6 Claims, 15 Drawing Sheets

K100

ABS-2
AXIS 1, 10000
AXIS 2, 20000
SPEED 100

FIG.7

| NUMBER OF DETECTION RANGE | 5 | ~22 |

| | OUTPUT SIGNAL | COMPARISON DATA | OUTPUT ON DATA VALUE | OUTPUT OFF DATA VALUE |
|---|---|---|---|---|
| DETECTION RANGE INFORMATION 1 | PY0 | REVOLUTION NUMBER OF UNIAXIAL SERVO MOTOR | 100 | 200 |
| DETECTION RANGE INFORMATION 2 | PY0 | REVOLUTION NUMBER OF UNIAXIAL SERVO MOTOR | D0 | D1 |
| DETECTION RANGE INFORMATION 3 | PY10 | D100 | -100 | -10 |
| DETECTION RANGE INFORMATION 4 | Y100 | CURRENT VALUE OF BIAXIAL SERVO MOTOR | 50 | 55 |
| DETECTION RANGE INFORMATION 5 | M200 | W300 | D1 | D2 |

| NUMBER OF OUTPUT SIGNAL INFORMATION | 4 |
|---|---|

28

| | OUTPUT SIGNAL NAME | OUTPUT SIGNAL IMAGE |
|---|---|---|
| OUTPUT SIGNAL INFORMATION 1 | PY0 | 0 |
| OUTPUT SIGNAL INFORMATION 2 | PY10 | 0 |
| OUTPUT SIGNAL INFORMATION 3 | Y100 | 0 |
| OUTPUT SIGNAL INFORMATION 4 | M200 | 0 |

| NUMBER OF REFERENCE DATA INFORMATION | 13 |
|---|---|

30

| | REFERENCE DATA ADDRESS | REFERENCE DATA VALUE |
|---|---|---|
| REFERENCE DATA INFORMATION 1 | MEMORY ADDRESS OF STORING AREA FOR REVOLUTION NUMBER OF UNIAXIAL SERVO MOTOR | 0 |
| REFERENCE DATA INFORMATION 2 | CONSTANT | 100 |
| REFERENCE DATA INFORMATION 3 | CONSTANT | 200 |
| REFERENCE DATA INFORMATION 4 | MEMORY ADDRESS OF D0 | 0 |
| REFERENCE DATA INFORMATION 5 | MEMORY ADDRESS OF D1 | 0 |
| REFERENCE DATA INFORMATION 6 | MEMORY ADDRESS OF D100 | 0 |
| REFERENCE DATA INFORMATION 7 | CONSTANT | -100 |
| REFERENCE DATA INFORMATION 8 | CONSTANT | -10 |
| REFERENCE DATA INFORMATION 9 | MEMORY ADDRESS OF STORING AREA FOR CURRENT VALUE OF BIAXIAL SERVO MOTOR | 0 |
| REFERENCE DATA INFORMATION 10 | CONSTANT | 50 |
| REFERENCE DATA INFORMATION 11 | CONSTANT | 55 |
| REFERENCE DATA INFORMATION 12 | MEMORY ADDRESS OF W300 | 0 |
| REFERENCE DATA INFORMATION 13 | D2 | 0 |

| NUMBER OF INDEX INFORMATION | 5 |
|---|---|

32

| | COMPARISON DATA INDEX | OUTPUT ON VALUE INDEX | OUTPUT OFF VALUE INDEX | OUTPUT SIGNAL INDEX |
|---|---|---|---|---|
| INDEX INFORMATION 1 | 1 | 2 | 3 | 1 |
| INDEX INFORMATION 2 | 1 | 4 | 5 | 1 |
| INDEX INFORMATION 3 | 6 | 7 | 8 | 2 |
| INDEX INFORMATION 4 | 9 | 10 | 11 | 3 |
| INDEX INFORMATION 5 | 12 | 5 | 13 | 4 |

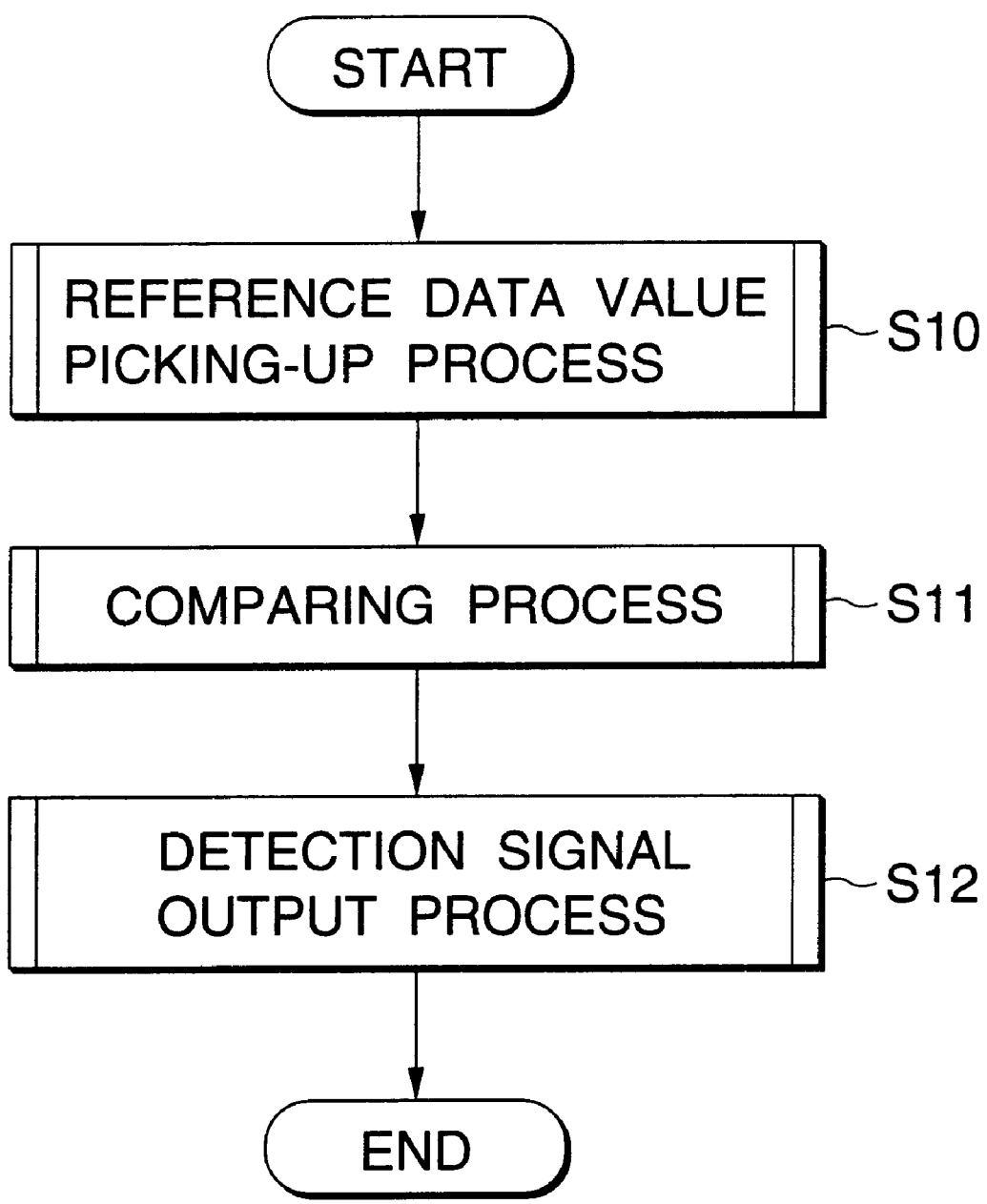

SERVO SYSTEM CONTROLLER

TECHNICAL FIELD

The present invention relates to a servo system controller having a sequence controlling section for executing a sequence program repetitively and a positioning controlling section for generating a positioning command of a servo motor based on a command issued from this sequence controlling section.

BACKGROUND ART

FIG. 14 is a block diagram showing a configuration of a conventional servo system controller. In FIG. 14, 100 denotes a servo system controller main body. This servo system controller main body 100 comprises a sequence controlling section 2 and a positioning controlling section 300.

As shown in FIG. 14, the sequence controlling section 2 includes a sequence control CPU 4, a control memory 5, an input/output interface 6, a peripheral device interface 7, and a device memory, e.g., a common memory 41.

A sequence program and a system program which are executed by the CPU 4 in the sequence controlling section 2 are stored in the control memory 5.

An input unit 8 and an output unit 9 of a controlled object are connected to the input/output interface 6.

Input information which are input from the controlled object (not shown) via the input unit 8, internal information, output information for the controlled object are stored in the common memory 41. The input information is updated every time when the sequence program is executed. Variables such as device names register numbers, etc. indicating storing areas for the input information, the internal information, and the output information in the common memory 41 are described in the sequence program. The internal information and the output information in the common memory 41 are updated by executing repeatedly the sequence program, and the output unit 9 is operated based on the output information to control the controlled object.

As shown in FIG. 14, the positioning controlling section 300 includes a positioning control CPU 10, a control memory 11, a positioning control program memory 12, an area signal parameter memory 38, a servo interface 15, and an area signal output interface 39.

A system program which is executed by the CPU 10 in the positioning controlling section 300 is stored in the control memory 11.

A servo controller 20 which executes drive control of a servo motor (not shown) is connected to the servo interface 15.

An area signal output unit 40 is connected to the area signal output interface 39. An area signal which changes in response to a current position of the servo motor is output from the area signal output unit 40 to the outside. If the servo motor drives a table via ball screws, the current position of the servo motor indicates a current position of the table.

The sequence program, a positioning control program, and an area signal output pattern are written into the control memory 5, the positioning control program memory 12, and the area signal parameter memory 38 by peripheral devices via the peripheral interface 7.

The common memory 41 in the sequence controlling section 2 is a memory which is called a dual port memory or a bilateral memory, and can be accessed by either the sequence control CPU 4 in the sequence controlling section 2 or the positioning control CPU 10 in the positioning controlling section 300.

FIG. 15 is a diagram showing a part of a memory configuration of the common memory 41. In FIG. 15, 41a denotes an area in which device information is stored, 41b denotes an area in which start information is stored, and 41c denotes an area in which monitor information is stored.

Next, an operation of the conventional servo system controller main body 100 shown in FIG. 14 will be explained.

The sequence controlling section 2 writes predetermined device information into the area 41a of the common memory 41 and writes predetermined start information into the area 41b of the common memory 41 by executing the sequence program.

The positioning controlling section 300 monitors the area 41b of the common memory 41, then reads the device information from the area 41a if the predetermined start information is written therein, and then executes the positioning control program in the positioning control program memory 12 which is designated by the device information. The positioning controlling section 300 sends a predetermined position command to the servo controller 20 via the servo interface 15 by executing this positioning control program. The servo controller 20 executes drive control of the servo motor based on this position command.

The positioning controlling section 300 compares the area signal output pattern stored in the area signal parameter memory 38 with the current position of the servo motor, and then turns an area signal which is output from the area signal output unit 40 to the outside via the area signal output interface 39 to its ON state (active state) if the current position of the servo motor is in an ON output range of the area signal output pattern.

Also, the positioning controlling section 300 stores command positions supplied to the servo controller 20, servo control information such as the current position of the servo motor, deviation counter values, current values, revolution numbers, etc., error information, and the like in the monitor area 41c of the random common memory 41 during the positioning operation.

The positioning controlling section 300 stores information indicating that positioning has been completed into the area 41c of the common memory 41 when the positioning is completed.

As described above, the area signal output pattern has been written in advance in the area signal parameter memory 38 by the peripheral devices. The area signal output pattern written in the area signal parameter memory 38 is compared with the current position of the servo motor serving as comparison data, and then the comparison result is output from the area signal output unit 40 to the outside as the area signal.

In the above-described conventional servo system controller, there are problems described in following items (1) to (5).

(1) As described above, normally the area signal is generated by using the current position of the servo motor as the comparison data. In this case, if the area signal is generated by using other servo control information as the comparison data, the sequence program in which a comparing process program for comparing other servo control information with the comparison data is described is prepared, and then the area signal is generated by executing the scanning of this sequence program.

Since the sequence program is executed in asynchronism with the arithmetic period of the positioning controlling section, a long time (response time) is required to change the servo output after it has been detected that the servo control information reaches a predetermined value, and thus huge variation in the response time is caused. Hence, a tact time of the system is long and the machining precision is degraded. In case the machining speed is increased for purpose of reducing the tact time, such influences become remarkable. Thus, an execution time of the sequence program must be shortened in order to reduce the response time or to stabilize the response time. Therefore, there are such problems that a high performance CPU is needed and a production cost is increased.

(2) If the area signal output is generated by using, as the comparison data, contents of the device memory which are designated by the device name (variable) and the register number described in the sequence program, such area signal is also generated by executing the scanning of the sequence program in which the comparing process program is described. Accordingly, in this case, the execution time of the sequence program must also be shortened in order to reduce the response time or to stabilize the response time, like the above case. Therefore, there are such problems that the high performance CPU is needed and the production cost is increased.

(3) Even if unused output points of the output points which are prepared for the area signal output unit are present, these output points are used exclusively for the area signals which are output based on the positioning control program. Therefore, there is such a problem that these output points cannot be used as the output points for the device which can be designated by the sequence program.

(4) The system is constructed such that the area signal output pattern is input previously by the peripheral devices and written into the area signal parameter memory 38. Therefore, if the area signal output pattern is to be changed, such area signal output pattern must be written similarly into the area signal parameter memory 38 via the peripheral devices.

(5) As described above, the system is constructed such that the area signal output pattern is input previously by the peripheral devices and written into the area signal parameter memory 38. However, there is such a problem that the number of the ON output ranges cannot be set arbitrarily.

The present invention has been made to overcome the above problems and it is an object of the present invention to provide a servo system controller which is capable of shortening the response time, reducing the tact time, and improving the machining precision without large increase of the cost even if the area signal is generated by using not only the current position of the servo motor as the comparison data but also the address contents of the device memory being designated by the device names (variables) and the register numbers described in the sequence program as the comparison data.

Also, it is an object of the present invention to provide a servo system controller which is capable of selecting arbitrarily the output unit which outputs the area signal.

Further, it is an object of the present invention to provide a servo system controller which is capable of setting arbitrarily the number of the ON output ranges.

DISCLOSURE OF THE INVENTION

In the servo system controller according to the present invention, a sequence controlling section which has a device memory in which device information such as output information, internal information, input information indicating a state of a controlled object, etc. are stored and a control memory for storing a sequence program in which variables indicating storing areas of the device information are described can repeat an operation for updating the input information and an operation for updating the output information or the internal information based on the sequence program and control the controlled object via the output information, a positioning controlling section which accesses the device memory and executes a positioning control program based on a command from the sequence controlling section to output a predetermined position command and has a comparing process table memory in which the device information and range information are set previously in response to a plurality of output units respectively can decide whether or not the device information is in a range indicated by the range information and then perform a process for outputting a decision result to the output units for the plurality of output units by referring to the comparing process table memory, and a servo controller executes servo driving control of a predetermined motor based on the position command. Therefore, in case the process which decides whether or not the value of the device information is in the range indicated by the range information and then outputs the decision result to the output unit is applied to a plurality of output units, there can be achieved such advantages that such process can be performed on the positioning controlling section, the increase and the variation of the decision process time can be prevented, and the tact time can be reduced without large increase of the cost if this operation is applied to the machining apparatus. Also, there can be achieved such an advantage that, if the increase and the variation of the decision process time have the influence upon the machining precision, reduction in the machining precision can be prevented.

Further, it is decided every execution period of the positioning control program whether or not a value of the device information is in a range indicated by the corresponding range information, and the process for outputting the decision result to the output units is performed for the plurality of output units. Therefore, if the process which decides whether or not the value of the device information is in the range indicated by the range information and then outputs the decision result to the output unit is applied to a plurality of output units, there can be achieved such advantages that such process can be performed easily on the positioning controlling section, the increase and the variation of the decision process time can be prevented more firmly, and the tact time can be reduced without large increase of the cost if this operation is applied to the machining apparatus. Also, there can be achieved such an advantage that, if the increase and the variation of the decision process time have the influence upon the machining precision, reduction in the machining precision can be prevented much more.

Furthermore, an area for storing the range information is provided in the device memory, the sequence controlling section executes the sequence program in which variables indicating this area are described, and the positioning controlling section obtains the range information from this area at a time of execution of the positioning control program Therefore, there is such an advantage that the range information can be changed easily by the sequence program.

Moreover, a plurality of pieces of range information are set previously for one output unit, and it is decided whether or not a value of corresponding device information is in a range indicated by the plurality of pieces of range information. Therefore, there is such an advantage that this system mates with the case where a plurality of pieces of range information are provided to one output unit correspondingly.

BRIEF DESCRIPTION OF THE DRAWINGS

FIG. 7 is a diagram showing a setting example of detection signal parameters;

FIG. 8 is a diagram showing a setting example of a comparing process table;

FIG. 9 is a flowchart showing details of a detection signal processing of the servo system controller shown in FIG. 1;

BEST MODES FOR CARRYING OUT THE INVENTION

Embodiment 1

[Configuration of the servo system controller]

Figure 1:
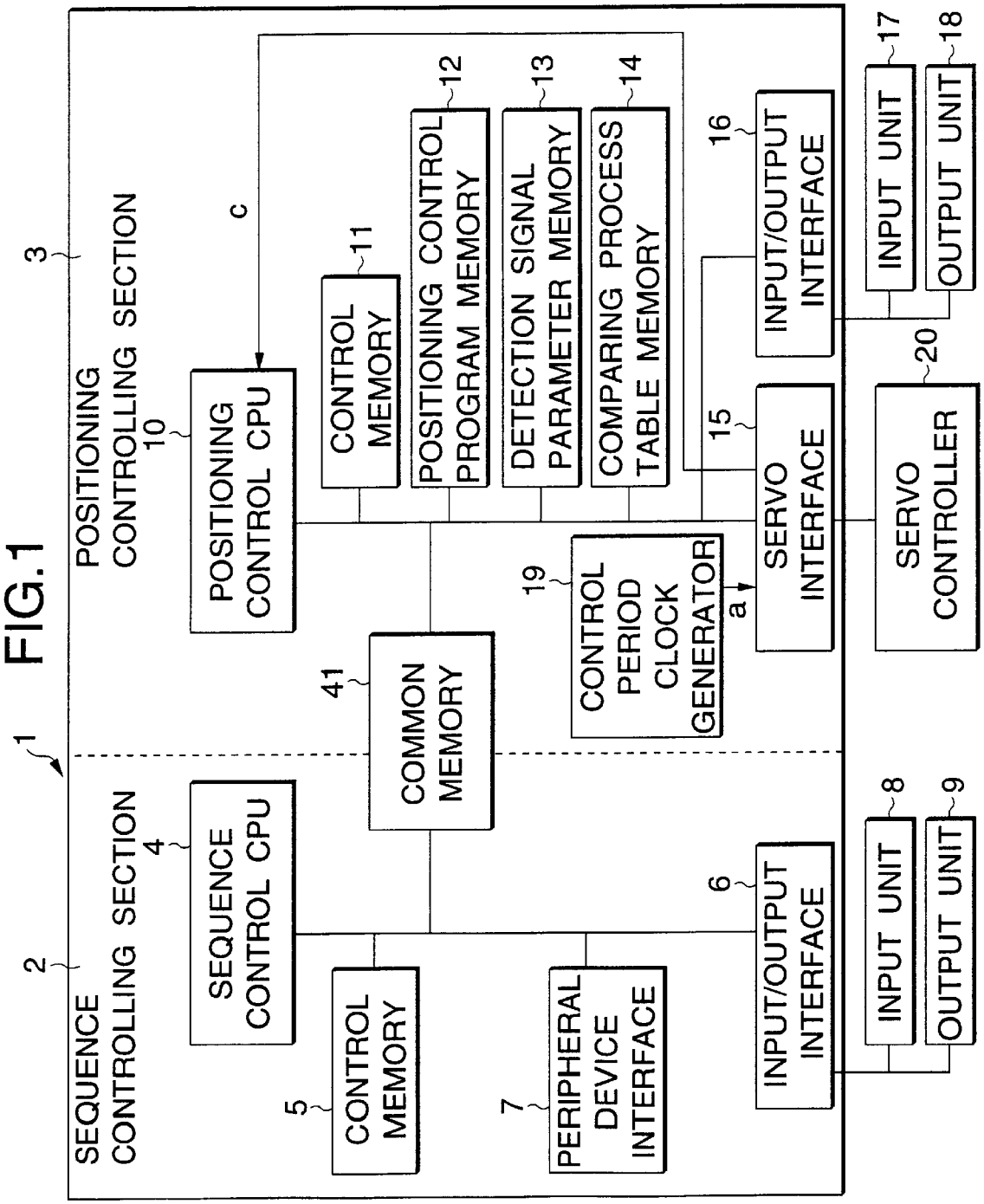
FIG. 1 is a diagram showing a configuration of a servo system controller according to an embodiment 1 of the present invention.

FIG. 1 is a diagram showing a configuration of a servo system controller (abbreviated as "SSC" hereinafter) according to an embodiment 1 of the present invention.

In a positioning controlling section 3 in FIG. 1, 13 denotes a detection signal parameter memory; 14, a comparing process table memory; 17, an input unit of a control object; 18, an output unit; 16, an input/output interface for the input unit 17 and the output unit 16; and 19, a control period clock generator.

Figure 14:
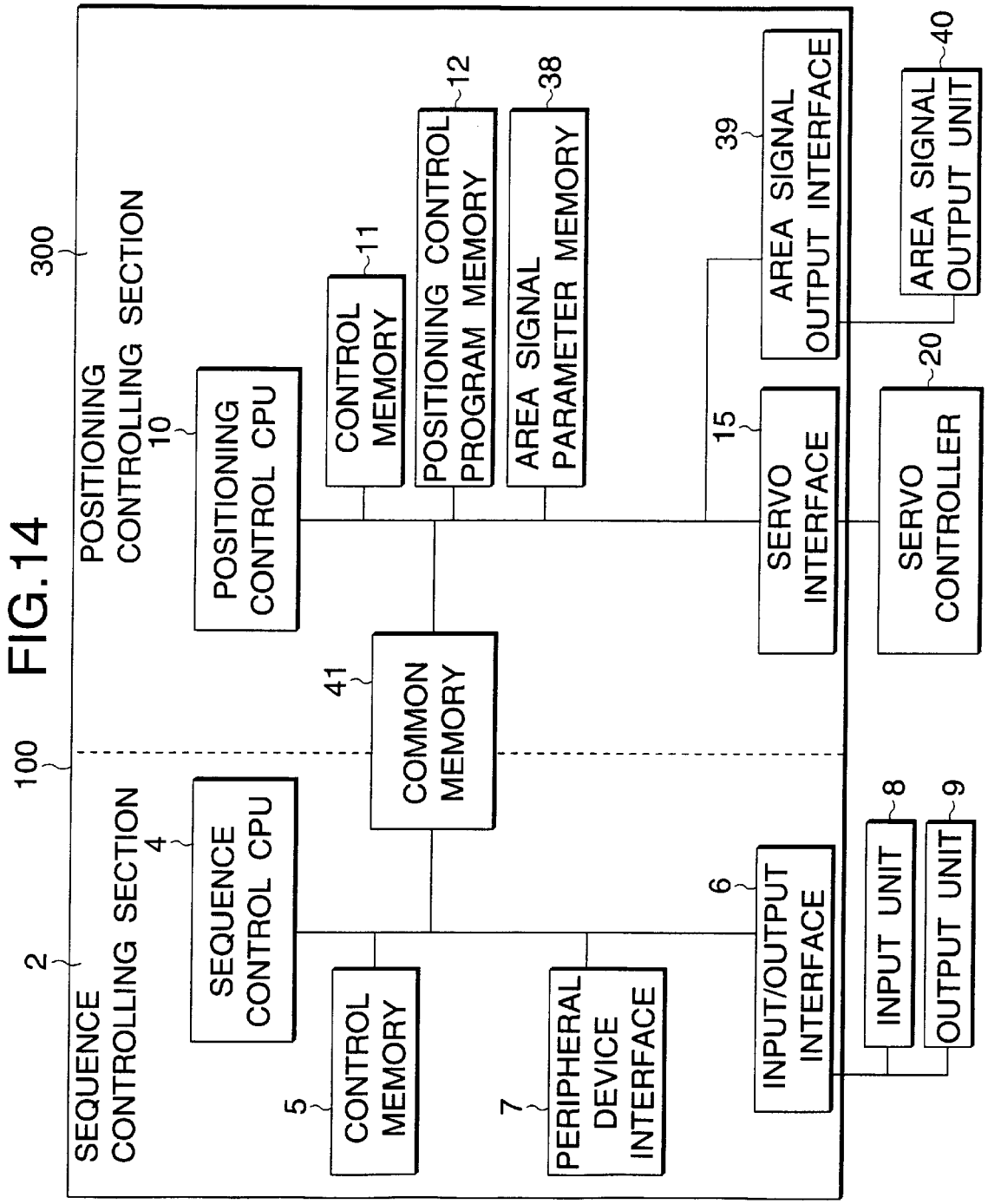
FIG. 14 is a diagram showing a configuration of a conventional servo system controller.
Figure 15:
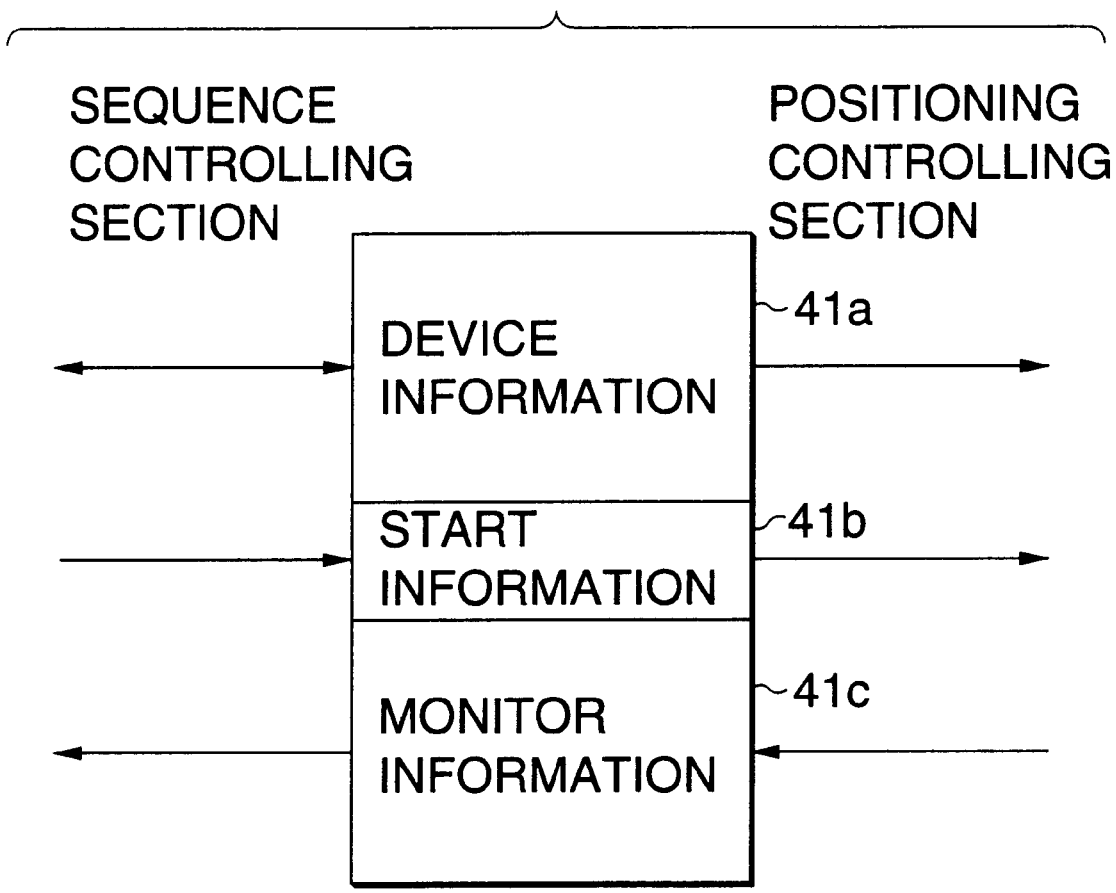
FIG. 15 is a diagram showing a memory configuration of a common memory shown in FIG. 14.

The positioning control CPU 10, the control memory 11, the positioning control program memory 12, the common memory 41 and the servo interface 15 are similar to those of the conventional system shown in FIG. 14. In the positioning controlling section 3 in FIG. 1, the area signal output interface 39 serving as the interface for the area signal output unit 40 and the area signal parameter memory 38 in FIG. 14 are not provided.

The control period clock generator 19 generates a control period clock signal. This control period clock signal is input into the servo interface 15. This servo interface 15 generates an interrupt signal (control period signal) at a leading edge of the control period clock signal. The positioning control CPU 10 executes read/write processes of servo control data based on this interrupt signal. In this case, as the servo control data, there are a current position of the servo motor, a speed of the servo motor, a current value of the servo motor, a position command of the servo motor, an alarm signal in the servo controller 20, etc.

The sequence controlling section 2, like the conventional system in FIG. 14, comprises the sequence control CPU 4, the control memory 5, the input/output interface 6, the common memory 41, and the peripheral device interface 7.

The common memory 41, like the conventional system, can be accessed from the sequence control CPU 4 in the sequence controlling section 2 and the positioning control CPU 10 in the positioning controlling section 3.

[Information stored in the detection parameter memory, the comparing process table memory, and the positioning control program memory in the positioning controlling section 3]

Figure 2:
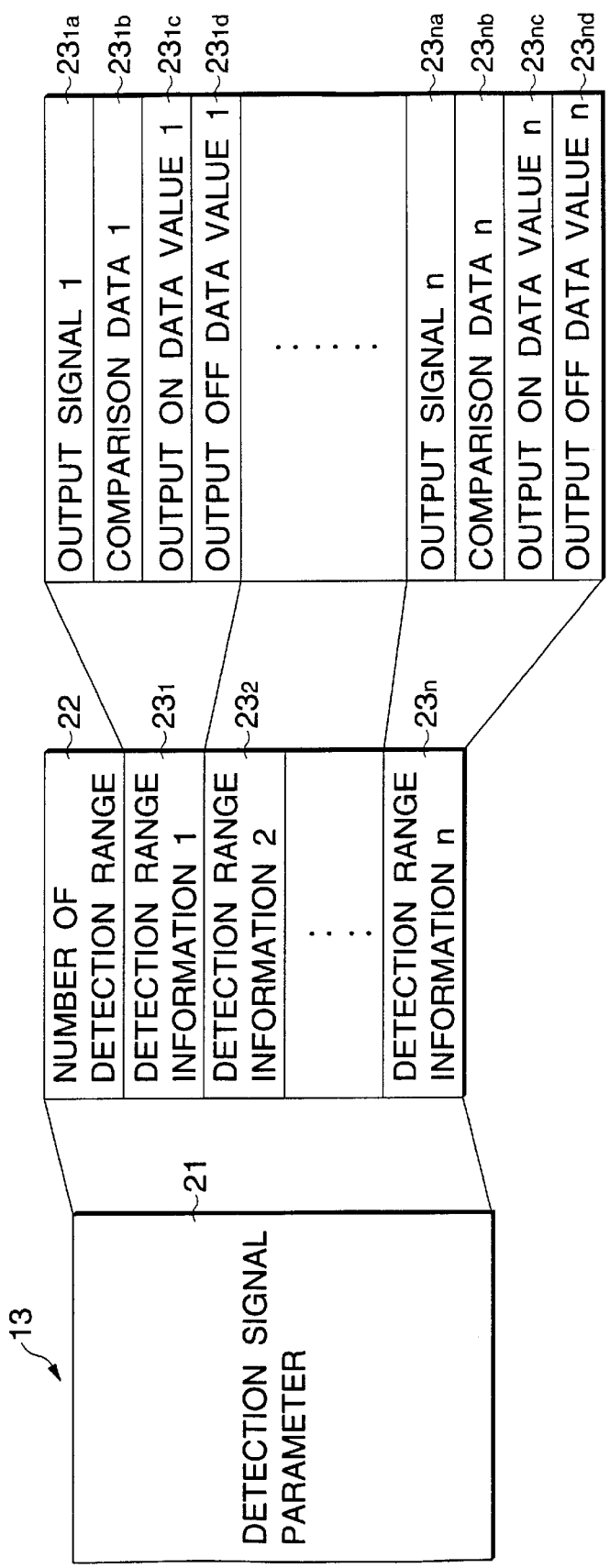
FIG. 2 is a diagram showing a memory configuration of a detection signal parameter memory in the servo system controller shown in FIG. 1.

FIG. 2 is a diagram showing an example of a memory configuration of the detection signal parameter memory 13.

In FIG. 2, 21 denotes an area of the detection signal parameter memory 13 for storing detection signal parameters.

As shown in FIG. 2, the area 21 consists of an area 22, an area $23_1$, . . . , an area $23_n$.

The setting number of detection range is stored in the area 22. A detection range information 1 is stored in the area $23_1$, and a detection range information n is stored in the area $23_n$.

In the area $23_1$ to the area $23_n$, the k-th (k=1, 2, . . . , n) area $23_k$ consists of an area $23_{ka}$ for storing the device name of the output signal, an area $23_{kb}$ for storing the servo control information name or the device name serving as the comparison data, an area $23_{kc}$ for storing the output ON data value acting as a start point of the detection range, and an area $23_{kd}$ for storing the output OFF data value acting as an end point of the detection range.

Figure 3:
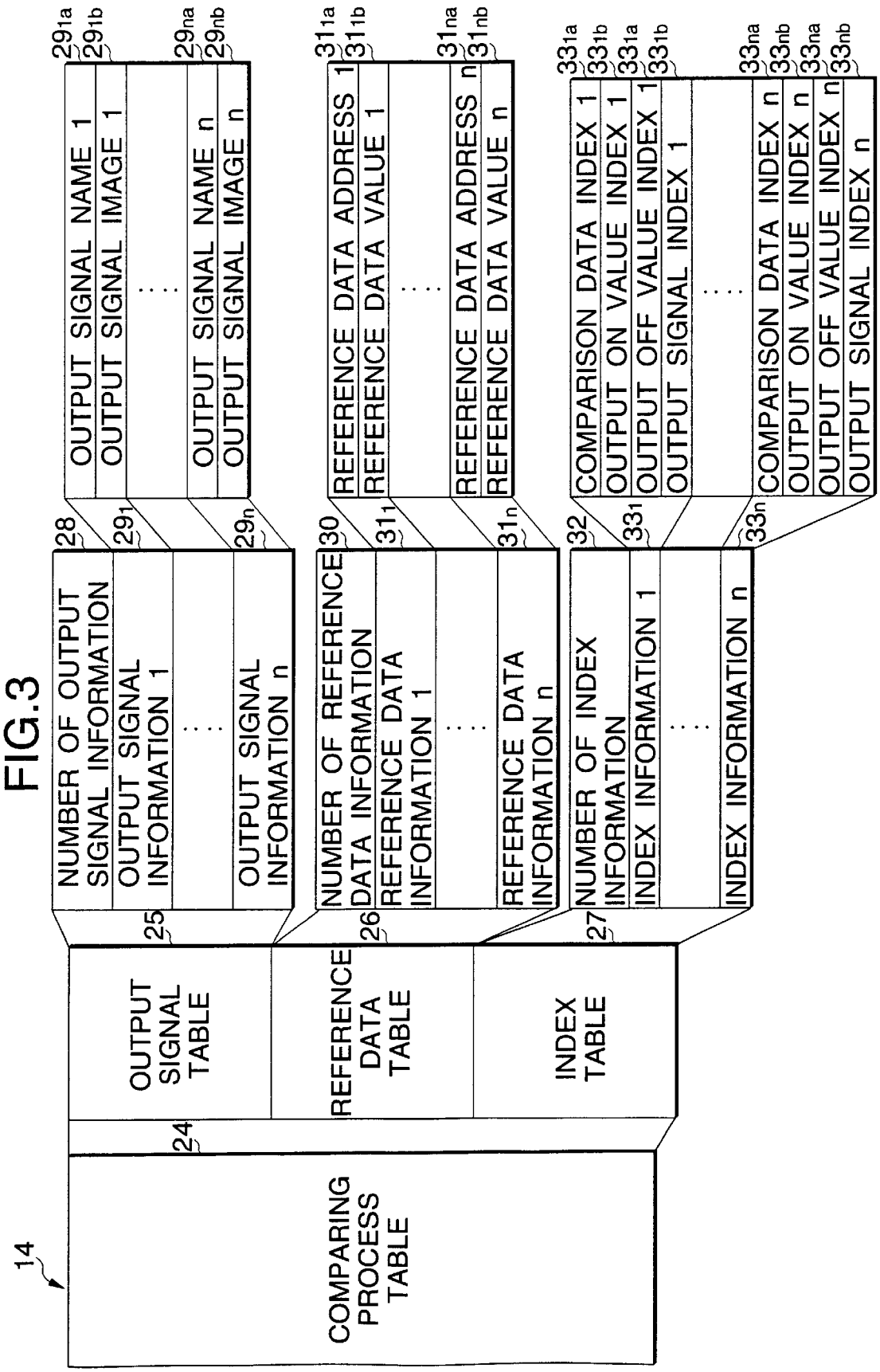
FIG. 3 is a diagram showing a memory configuration of a comparing process table memory in the servo system controller shown FIG. 1.

FIG. 3 is a diagram showing an example of a memory configuration of the comparing process table memory 14. In FIG. 3, 24 denotes an area of the comparing process table memory 14 for storing the comparing process table.

As shown in FIG. 3, this area 24 consists of an area 25 for storing the output table, an area 26 for storing the reference data table, and an area 27 for storing index information.

The area 25 consists of an area 28 for storing the number of output signal information, and an area $29_1$ (area in which an output signal information 1 is stored) to an area $29_n$ (area in which an output signal information n is stored).

In the area $29_1$ to the area $29_n$, the k-th (k=1, 2, . . . , n) area $29_k$ consists of an area $29_{ka}$ for storing the device name of the output signal, and an area $29_{kb}$ for storing the ON or OFF information image of the output signal.

Even if the same output signals are set duplicatedly in the area $23_{1a}$ to the area $23_{na}$ in FIG. 2, they are never set duplicatedly in the area 25 but only one output signal is set.

The area 26 consists of an area 30 for storing the number of reference data information, and an area $31_1$ (area in which a reference data information 1 is stored) to an area $31_n$ (area in which a reference data information n is stored).

In the area $31_1$ to the area $31_n$, the k-th (k=1, 2, . . . , n) area $31_k$ consists of an area $31_{ka}$ for storing the reference data address, and an area $31_{kb}$ for storing the reference value data.

Like the case of the area 25, in the case of the area 26, even if the same devices are set duplicatedly in the area $23_{1b}$ to the area $23_{nb}$, the area $23_{1c}$ to the area $23_{nc}$, and the area $23_{1d}$ to the area $23_{nd}$, they are never set duplicatedly but only one output signal is set.

Information indicating the correspondence between information stored in the area 25 and information stored in the area 26 is stored in the area 27. This area 27 consists of an area 32 for storing the number of index information, and an area $33_1$ (area in which an index information 1 is stored) to an area $33_n$ (area in which an index information n is stored).

In the area $33_1$ to the area $33_n$, the k-th (k=1, 2, . . . , n) area $33_k$ consists of an area $33_{ka}$ for storing the comparison data index k indicating which data of the area 26 stored in the reference data table corresponds to the comparison data, an area $33_{kb}$ for storing the output ON value index which indicates which data of the area 26 corresponds to the output ON value data, an area $33_{kc}$ for storing the output OFF value index k which indicates which data of the area 26 corresponds to the output OFF value data, and an area $33_{kd}$ for storing the output signal index k indicating which data of the area 25 in which the output signal table is stored corresponds to the output signal.

Figure 4:
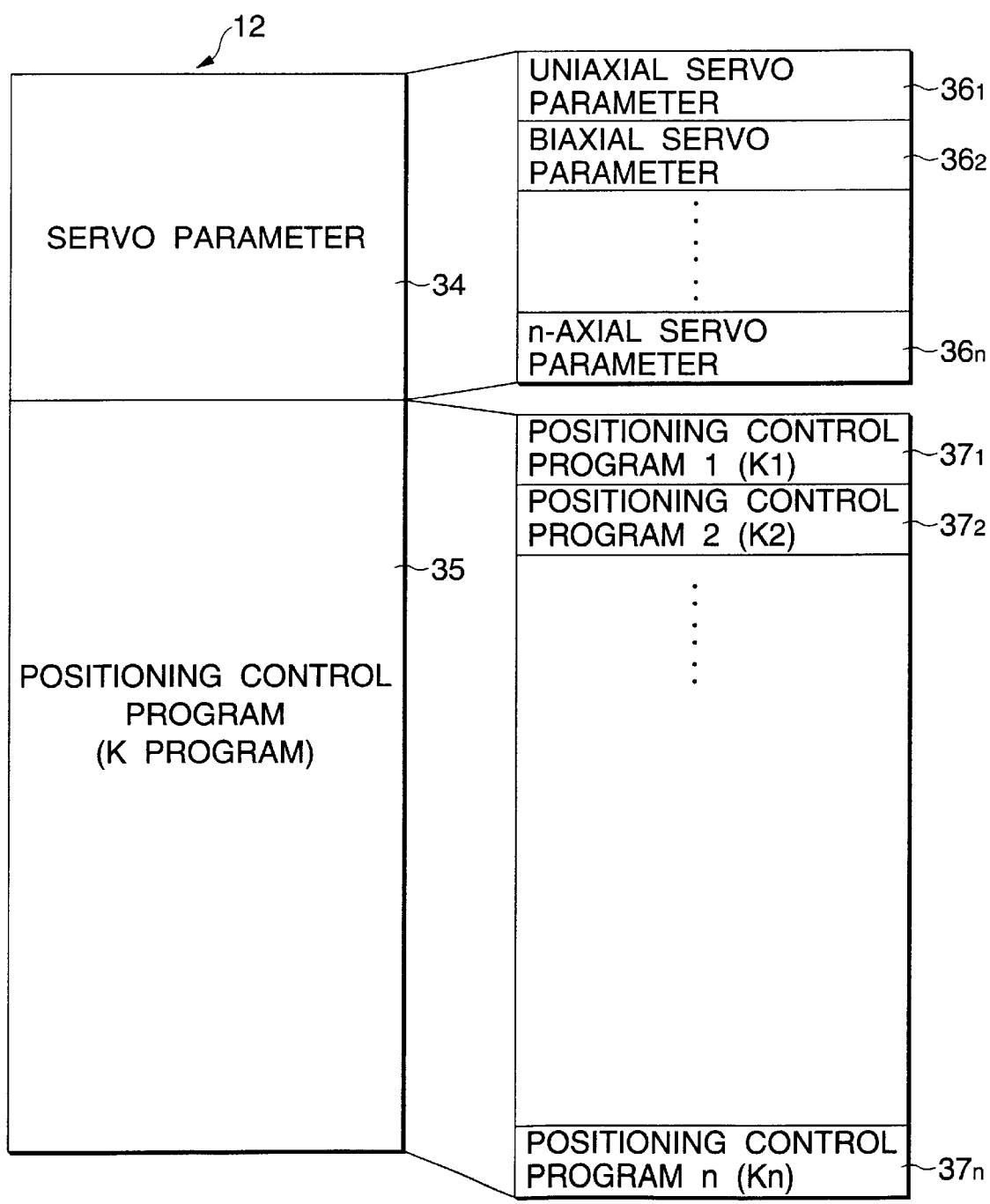
FIG. 4 is a diagram showing a memory configuration of a positioning control program memory in the servo system controller shown in FIG. 1.

FIG. 4 is a diagram showing an example of a memory configuration of the positioning control program memory 12. In FIG. 4, 34 denotes an area of the positioning control program memory 12 for storing the servo parameter, and 35 denotes an area for storing the positioning control program.

The area 34 consists of an area $36_1$ (area in which a uniaxial servo parameter is stored) to an area $36_n$ (area in which an n-axial servo parameter is stored).

In the area $36_k$ (k=1, 2, . . . , n), system of units, type of the servo amplifier, type of the servo motor, etc. are stored as the k-axial servo parameter.

The area 35 consists of an area $37_1$ (area in which a positioning control program having a program number 1 is stored) to an area $37_n$ (area in which a positioning control program having a program number n is stored).

In the area $37_k$ (k=1, 2, . . . , n), the positioning control program for executing home position return, interpolation control of plural axes, speed control, position tracking control, etc. is stored as a positioning control program having a program number k.

[Operation of the positioning controlling section]

Next, an overall operation of the positioning controlling section 3 will be explained with reference to a timing chart shown in FIG. 5.

Figure 5:
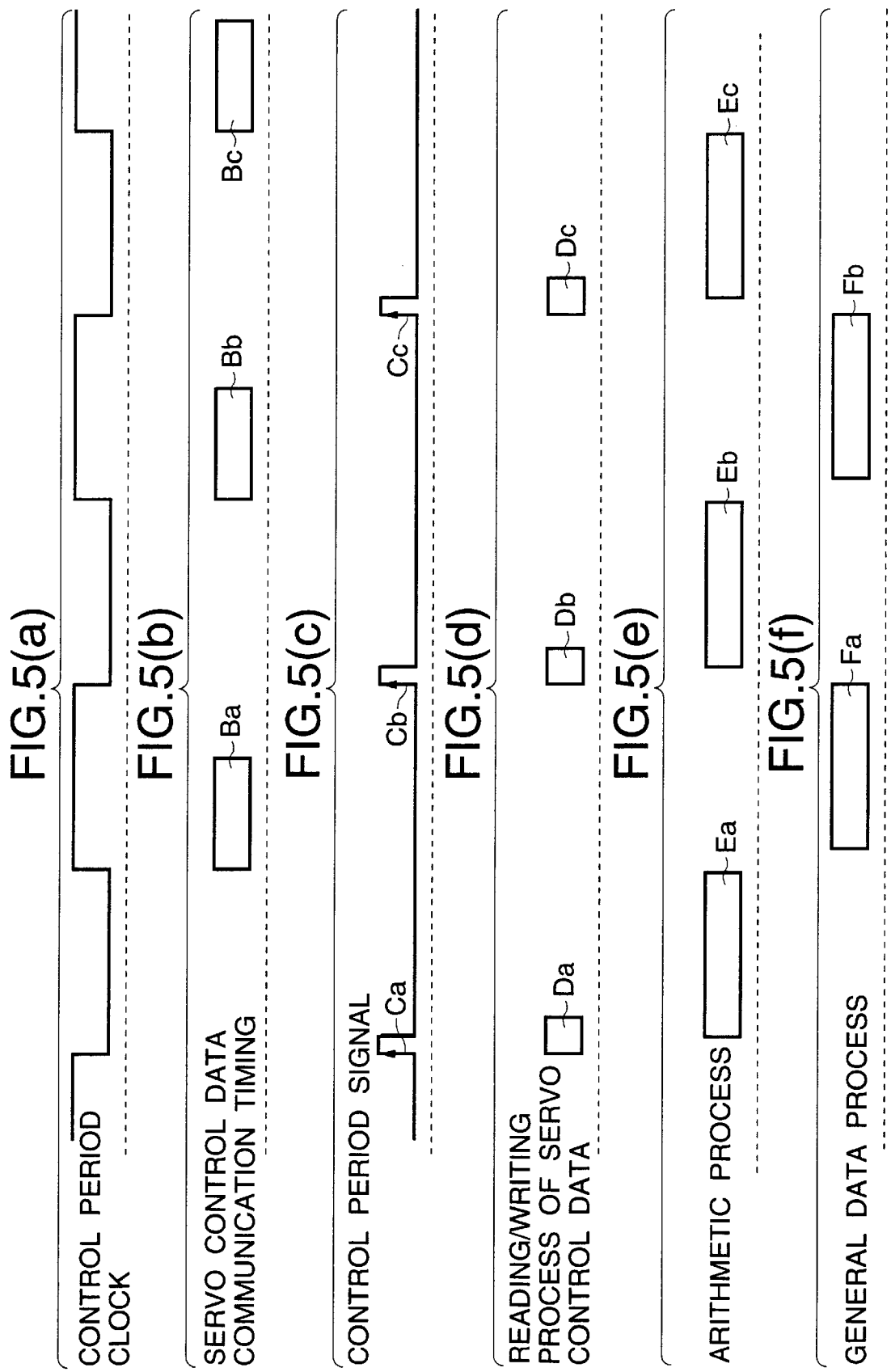
FIGS. 5(a)–5(f) are timing charts showing an opration of the servo system controller shown in FIG. 1.

In FIG. 5, (a) shows a waveform of a control period clock which is input from the control period clock generator 19 to the servo interface 15.

(b) shows a servo control data communication timing, i.e., a timing at which transmission/reception of the servo control data is carried out between the servo interface 15 and the servo controller 20.

Ba, Bb, Bc denote the servo control data communication (transmission/reception between the servo controller 20 and the servo interface 15) which is started at a leading edge of the control period clock, respectively.

(c) shows a control period signal which is input from the servo interface 15 to the positioning control CPU 10, and Ca, Cb, Cc denote a leading edge of the control period signal. This control period signal rises at a trailing timing of the control period clock to act as an interrupt signal for the positioning control CPU 10.

(d) shows reading/writing process of the servo control data. The servo control data are transmitted and received between the positioning control CPU 10 and the servo interface 15 by this process.

Da, Db, Dc denote processes for performing reading/writing of the servo control data respectively. These processes are started at edges Ca, Cb, Cc respectively.

(e) shows an arithmetic process which executes acceleration/deceleration operation, interpolation operation of plural axes, etc. in the positioning control. Ea, Eb, Ec denote the arithmetic processes respectively.

The arithmetic processes Ea, Eb, Ec are started at the time of end of the reading/writing process Da, Db, Dc of the servo control data as real-time tasks respectively.

In these arithmetic processes, picking-up of the reference data, comparison between the comparison data and the output ON value, comparison between the comparison data and the output OFF value, setting of the output signal image, outputting of the output signal, etc. are also carried out.

(f) shows a general data process which has the lower priority level than the above positioning controlling processes which need the real-time processing. As such process, there are the process for setting monitor data into the common memory 41, the process for exchanging the information between the peripheral devices and the positioning controlling section via the common memory 41, etc.

Fa, Fb denote the general data process respectively. These general data processes are finished respectively until the starting timing of next real-time process (leading timing of the control period signal).

[Operation of the sequence controller]

Next, an operation of the sequence controlling section 2 will be explained hereinafter. Like the conventional system, the positioning controlling section 3 can use the arithmetic results derived in the sequence controlling section 2 in the positioning control by referring to the device information in the common memory 41. Further, the positioning controlling section 3 in the embodiment 1 of the present invention is constructed so as to transmit the information, which are written into predetermined areas of the common memory 41 from the sequence controlling section 2, to the output unit via the input/output interface 16 and to write the information, which are transmitted from the input unit 17 via the input/output interface 16, into the predetermined areas of the common memory 41. Therefore, the sequence controlling section 2 can monitor another information being input into the positioning controlling section 3 in addition to the servo control data such as the current position of the servo motor, the speed of the servo motor, etc. by accessing the predetermined area of the common memory 41, and can also control the controlled object via another output unit connected to the positioning controlling section 3.

[Detailed operation of the positioning controlling section]

Then, an operation of the positioning controlling section 3 will be explained in detail while taking the case where such operation is followed by the area signal outputting process as an example. The positioning control program is stored previously into the positioning control program memory 12 from the peripheral device via the common memory 41, and also the detection signal parameters are stored in advance from the peripheral devices into the detection signal parameter memory 13 via the common memory 41.

Figure 6:
FIG. 6 is a diagram showing an example of a positioning control program in the servo system controller.

FIG. 6 is a diagram showing an example of the positioning control program stored in the positioning control program memory 12.

In FIG. 6, K100 denotes the positioning control program having the program number 100. This positioning control program is stored in an area $37_{100}$, which is a storing area for the positioning control program whose program number is 100, of the area 35 of the positioning control program memory 12 shown in FIG. 4.

This positioning control program K100 is a positioning control program which controls the positioning between an axis 1 and an axis 2 based on the absolute type linear interpolation system, and which performs the biaxial linear interpolation by using a synthesis speed 100 such that the axes 1 and 2 can be positioned to addresses 10000 and 20000 respectively.

FIG. 7 is a diagram showing a setting example if n=5 is set in the area 21 in which the detection signal parameters in FIG. 2 are stored. As shown in FIG. 7, 5 is stored in the area 22 as the number of detection range.

In FIG. 7, the detection range information k (k=1 to 5) indicates that the output signal is turned ON during when the "comparison data" is in the range of not less than the "output ON data value" but less than the "output OFF data value".

PY0 is a variable name of the device which indicates an output signal of the output unit 18 being connected to the positioning controlling section 3, and is discriminated by adding P from the variable name Y0 indicating the output signal of the output unit 9 which is connected to the sequence controlling section 2.

The detection range information 1 shows that the PY0 is turned ON during when the revolution number of a uniaxial servo motor is in the range of not less than 100 but less than 200.

The detection range information 2 shows that the PY0 is turned ON during when the revolution number of the uniaxial servo motor is in the range of not less than a D0 value but less than a D1 value.

PY0 is turned ON under the logical sum condition of the detection range information 1 and the detection range information 2. D0, D1 are data register devices used in the sequence control. These D0, D1 can also be read/written by the positioning controlling section 3 since they are stored in the common memory 41.

The detection range information 3 indicates that Y100 is turned ON during when D100 is in the range of not less than −100 and less than −10.

The detection range information 4 indicates that Y100 is turned ON during when the biaxial servo motor current is in the range of not less than 50 and less than 55.

The detection range information 5 indicates that M200 is turned ON during when W300 is in the range of not less than the value of D1 and less than the value of D2.

W300, M200 are a link register device and an internal relay device used in the sequence control respectively. W300, M200 can also be read/written by the positioning controlling section 3 since they are stored in the common memory 41.

FIG. 8 is a diagram showing a setting example of the comparing process table 14 in FIG. 3 when the detection signal parameter 21 in FIG. 2 is set as shown in FIG. 7. This comparing process table 14 is set by referring to the detection signal parameter 21 in the initial process at the time of the power supply ON or reset of the servo system controller.

The number of output signals shown in FIG. 7 except for the overlapped output signals is stored in an area 28 of the comparing process table 14. In this example, since the output signal PY0 of the detection range information 1 and the output signal PY0 of the detection range information 2 are overlapped with each other, 4 is stored in the area 28 in FIG. 3 as the number the output signal information, as shown in FIG. 8.

In an area $29_{1a}$ to an area $29_{4a}$ in FIG. 3 in which output signal names of an output signal information 1 to an output signal information 4 are stored, the output signal names of the output signals shown in FIG. 7 except for the overlapped output signals are stored. In areas $29_{1b}$ to $29_{4b}$ in FIG. 3 in which the output images are stored, 0 is stored at the time of the initial process.

The number of the comparison data, the output ON data value, and the output data value in FIG. 7 other than the overlapped data is stored as the number of reference information. In this example, since the comparison data of the detection information 1 and the comparison data of the detection information 2 are overlapped with each other and also the output OFF data value of the detection information 2 and the output ON data value of the detection range information 5 are overlapped with each other, 13 is stored in an area 30 in FIG. 3 as the reference data information, as shown in FIG. 8.

In areas $31_{1a}$ to $31_{13a}$ in FIG. 3 in which reference data addresses of the reference data information 1 to the reference data information 13 are stored, information indicating a constant is stored if the address is the constant, and a memory address of the storing area is stored if the address is other than the constant, as shown in FIG. 8.

In areas $31_{1b}$ to $31_{13b}$ in FIG. 3 in which a reference data value 1 to a reference data value 13 are stored, a concerned value is stored if the value is the constant value, and 0 is stored if the value is other than the constant value, as shown in FIG. 8

In an area 32 in FIG. 3 in which the number of index information is stored, the same value as the content of the area 22 in FIG. 2 (the content of the area 22 is shown in FIG. 7) is stored. In this example, 5 is stored, as shown in FIG. 8.

In an area $33_1$ to an area $33_5$ in FIG. 3 in which an index information 1 to an index information 5 are stored, respective information in the detection range information 1 to the detection range information 5 (these are shown in FIG. 7) are stored after they are replaced with 1 to 13 which indicate row numbers of the reference data information 1 to the reference data information 13 and 1 to 4 which indicate row numbers of the output signal information 1 to the output signal information 4, as shown in FIG. 8.

Since the sequence controlling section 2 writes a value of the device information into an area 41a of the common memory 41 and also writes predetermined start information into an area 41b by executing the sequence program, the positioning controlling section 3 monitors the area 41b of the common memory 41 in the arithmetic process indicated by a symbol Eb in FIG. 5(e), and then reads the value of the device information from the area 41a if the predetermined start information is stored therein.

If this information corresponds to the information for starting the positioning control program 100, the positioning controlling section 3 executes the positioning control program stored in the positioning control program memory 12 and having the program number 100 and then sends a position command to the servo controller 20 via the servo interface 15.

As described above, K100 shown in FIG. 6 is an absolute type biaxial linear interpolation control program. Since the program positions an axis 1 and an axis 2 to the address 10000 and the address 20000 at a synthesis speed 100 respectively, it executes calculations such as an axis speed calculating process, an accelerating/decelerating process, etc. and then writes calculated results into the servo interface 15 in the servo control reading/writing process indicated by Dc in FIG. 5(d).

The servo interface 15 sends the position command to the servo controller 20 by Bc in FIG. 5(b) independently from the process in the positioning control CPU 10. The servo motor executes the positioning operation based on the output signal of the servo controller 20.

[Area signal generating process in the positioning controlling section 3]

Next, an area signal generating process in the arithmetic process shown in FIG. 5(e) will be explained with reference to a flowchart in FIG. 9. As described above, this arithmetic process is executed in the positioning calculation process.

In FIG. 9, in step S10, a reference data value picking-up process (process for reading address contents indicated by the reference data addresses which are stored in the area $31_{1a}$ to the area $31_{na}$ of the comparing process table memory 14, and then setting them in the area $31_{1b}$ to the area $31_{nb}$ as the reference data values) is carried out.

In step S11, a comparing process (process for executing the comparison between the comparison data stored in the area $23_{1b}$ to the area $23_{nb}$ of the detection signal parameter memory 13 and the reference data values stored in the area $31_{1b}$ to the area $31_{nb}$ based on the index informations stored in the area $33_1$ to the area $33_n$ of the comparing process table memory 14, and then setting comparison results in the area $29_{1b}$ to the area $29_{nb}$ of the comparing process table memory 14 as the output signal images)is carried out.

In step S12, a detection signal output process (process for setting the output signal images stored in the area $29_{1b}$ to the area $29_{nb}$ of the comparing process table memory 14 into the concerned areas (areas acting as the devices having the output signal names) of the common memory 41) is carried out.

Figure 10:
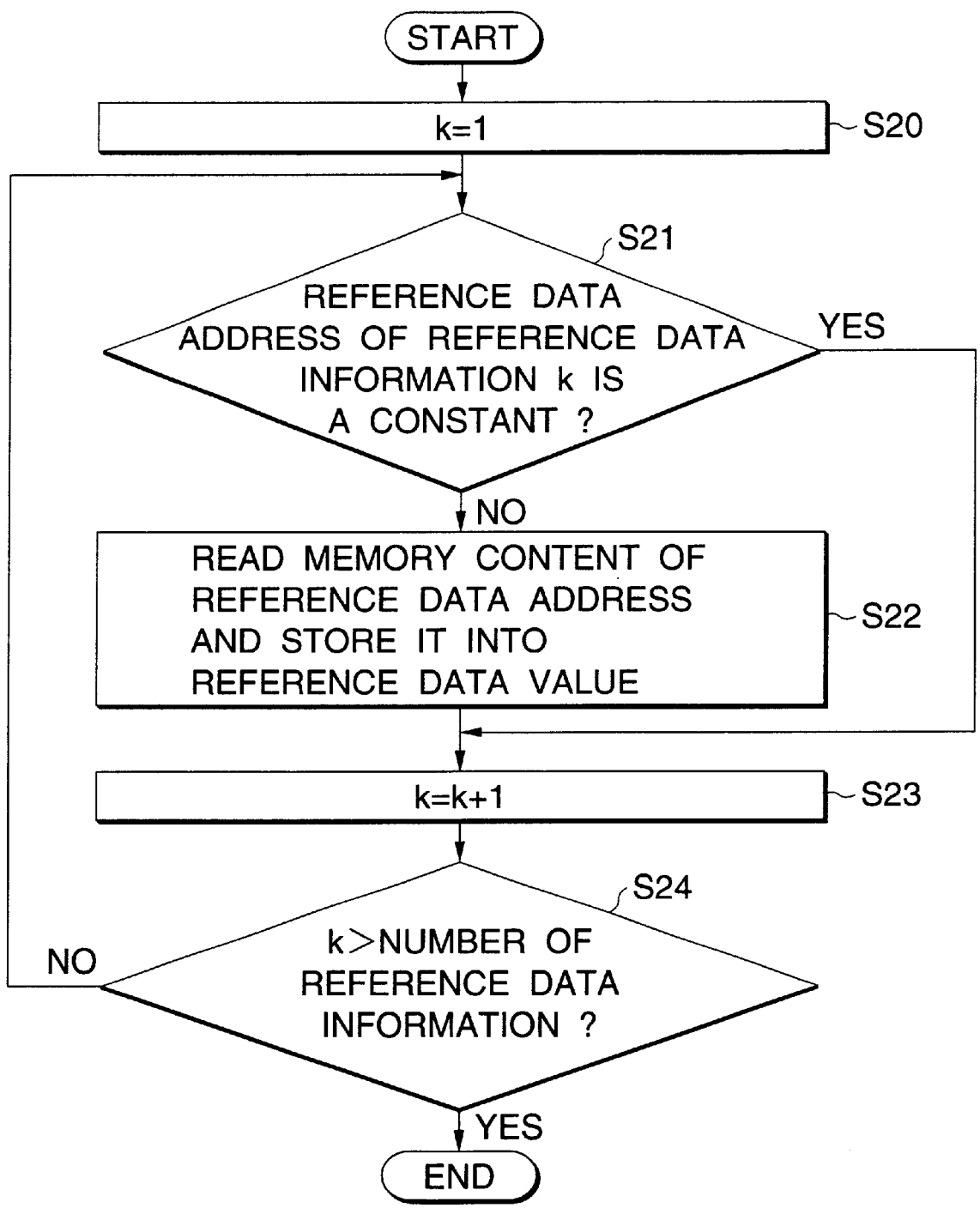
FIG. 10 is a flowchart showing details of a reference data value picking-up process in FIG. 9.

FIG. 10 is a flowchart showing a detailed operation of the reference data value picking-up process executed in step S10 in FIG. 9.

In FIG. 10, in step S20, 1 is set to a variable k.

In step S21, it is decided whether or not the reference data addresses of the reference data information k stored in the area $31_{1b}$ to the area $31_{nb}$ of the comparing process table memory 14 are constants. The process advances to step S22 if such addresses are not the constants, while the process advances to step S23 if such addresses are the constants.

In step S22, the address content indicated by the reference data address (reference data address stored in the area $31_{ka}$ of the comparing process table memory 14) is read, and then the content is stored into the area $31_{kb}$ of the comparing process table memory 14 as the reference data value. Then, the process goes to step S23.

In step S23, 1 is added to the variable k.

In step S24, the process is ended if the variable k is larger than the number of the reference data information stored in the area 30 of the comparing process table memory 14. The process returns to step S21 if the variable k is not larger than the number of the reference data information.

Figure 11:
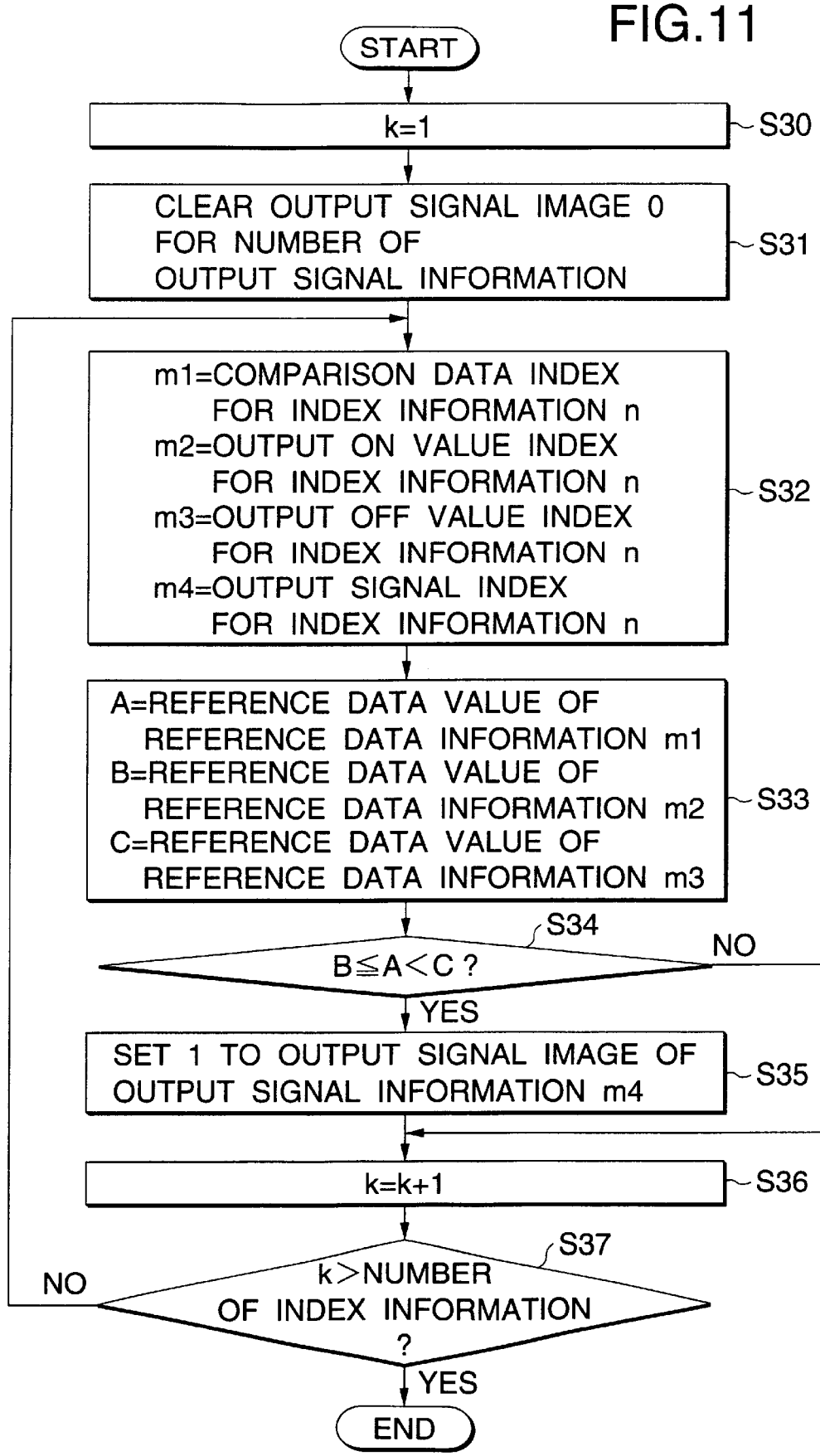
FIG. 11 is a flowchart showing details of a comparing process in FIG. 9.

FIG. 11 is a flowchart showing a detailed operation of the comparing process executed in step S11 in FIG. 9.

In FIG. 11, in step S30, 1 is set to the variable k.

In step S31, the output signal images for the numbers n of the output signal information stored in the area 28 of the comparing process table memory 14 (output signal images stored in the area $29_{1b}$ to the area $29_{nb}$) are cleared.

In step S32, the comparison data index k, the output ON value index k, the output OFF value index k, and the output signal index k of the index information k stored in the area $33_k$ of the comparing process table memory 14 are set in a variable m1, a variable m2, a variable m3, and a variable m4 respectively.

In step S33, the reference data value of the reference data information m1 stored in the m1-th area of the area $31_1$ to the area $31_n$ of the comparing process table memory 14 is set in a variable A, the reference data value of the reference data information m2 stored in the m2-th area is set in a variable B, and the reference data value of the reference data information m3 stored in the m3-th area is set in a variable C.

In step S34, it is decided whether or not the variable A satisfies the condition of the variable B≦the variable A<the variable C. The process proceeds to step S35 if the variable A satisfies such condition, while the process proceeds to step S36 if the variable A does not satisfy such condition.

In step S35, 1 is set to the output signal image of the output signal information m4 which is stored in the m4-th area of the area $29_1$ to the area $29_n$ of the comparing process table memory 14. The process goes to step S36.

In step S36, 1 is added to the variable k.

In step S37, the process is ended if the variable k is larger than the number of the index information stored in the area 32 of the comparing process table memory 14. The process returns to step S32 if the variable k is not larger than the number-of the index information.

Figure 12:
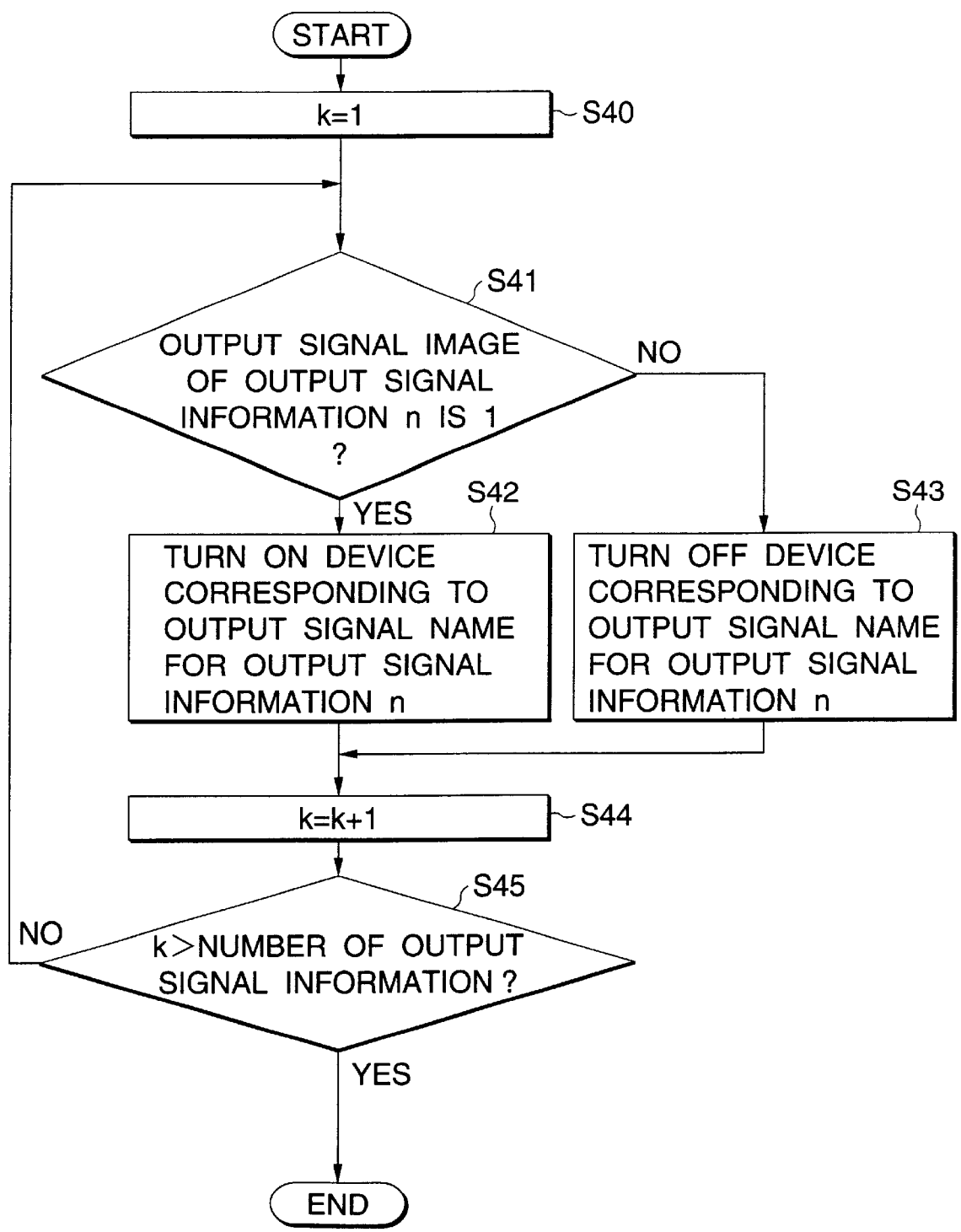
FIG. 12 is a flowchart showing details of a detection signal output process in FIG. 9.

FIG. 12 is a flowchart showing an operation of the detection signal output process executed in step S12 in FIG. 9.

In FIG. 12, in step S40, 1 is set to the variable k.

In step 41, it is decided whether or not the output signal image of the output signal information k stored in the area 29-k of the comparing process table memory 14 is 1. The process advances to step S42 if the output signal image is 1, while the process advances to step S43 if the output signal image is 0.

In step 42, 1 is set to the concerned area of the common memory 41 (area in which the output signal name is the device name). The process goes to step S44.

In step 43, 0 is set to the concerned area of the common memory 41. The process goes to step S44.

In step 44, 1 is added to the variable k. The process goes to step S45.

In step 45, the process is ended if k is larger than the number of the output signal information. The process returns to step S32 if k is not larger than the number of the output signal information.

Figure 13:
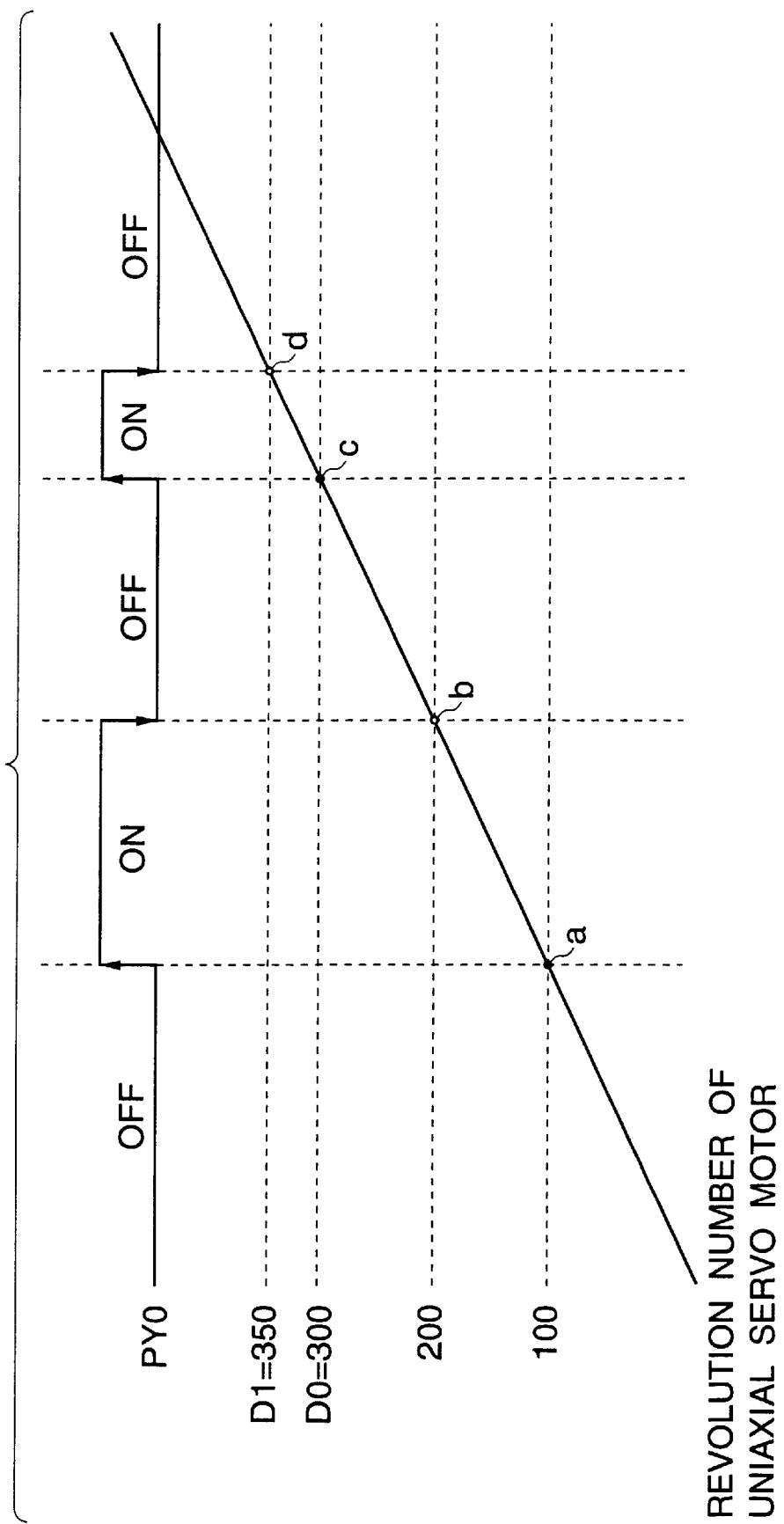
FIG. 13 is a timing chart showing an example of output signals in the detection signal output process in FIG. 9.

FIG. 13 shows the output signal PY0 generated by the arithmetic process shown in FIG. 9 in the case that data shown in FIG. 7 is stored in the area 21 of the detection signal parameter memory 13 and 100 and 350 are stored in D0 and D1 respectively.

As shown in FIG. 13, when the revolution number of the uniaxial servo motor is increased, PY0 is changed from OFF to ON at a point a where the revolution number reaches 100, then changed from ON to OFF at a point b where the revolution number reaches 200, then changed again from OFF to ON at a point c where the revolution number reaches 300, and then changed from ON to OFF at a point d where the revolution number reaches 350.

[Summary]

According to the embodiment 1 of the present invention, an operation for applying the process, which decides whether or not the value of the device information is in the range indicated by the range information and then outputs the decision result to the output unit, to a plurality of output units can be performed singly on the positioning controlling section. Therefore, there can be achieved such advantages that the increase and the variation of the decision process time because of the executing time of the sequence program can be prevented and that the tact time can be reduced without large increase of the cost if this operation is applied to the machining apparatus.

For example, in the situation that the working object is fixed to the table and the table is driven by the servo motor to work the object by the drill, such operation can be utilized to monitor that respective device information is not outside the range information under the assumption that the table position is set to the first device information and the drill position or the current value of the motor for driving the drill is set to the second device information. In this case, the range information can be easily changed every working object. Also, for example, in the case that the increase and the variation of the decision process time have the influence upon the machining precision, e.g., the case where the cutter is started based on the decision result, there can also be achieved such an advantage that reduction in the machining precision can be prevented.

According to the embodiment 1 of the present invention, even if the same comparison data name is set duplicatedly in the detection range information 1 to the detection range information n stored in the area $23_1$ to the area $23_n$ of the detection signal parameter memory 13, the same comparison data name is not set duplicatedly in the comparing process table 24. Therefore, the problem that values of the comparison data become different due to difference in the reading time of the comparison data is never generated, and thus generation of improper output of the output signal due to such problem can be prevented.

Further, if the same output signal name is set duplicatedly in the detection range information 1 to the detection range information n stored in the area $23_1$ to the area $23_n$ of the detection signal parameter memory 13, a logical sum of the output signals based on respective detection range information can be output as the output signal of the output signal name.

Moreover, since this area signal generating process is executed in the arithmetic process for carrying out the reading/writing process of the servo control data, the variation of the response time of the output signal is one period of the clock 18 at its maximum. Normally the period of the clock 18 is about 0.1 ms to 5 ms and is about 1/10 to 1/100 of the scanning time of the sequence controlling section 2.

Embodiment 2

In the above embodiment 1, the comparing process table memory 14 is set by the initial process at the time of power supply ON or reset of the servo system controller by referring the detection signal parameter 13. However, if the detection signal parameter memory 13 is set in the memory of the peripheral device and then the data to be written into the comparing process table memory 14 is generated by the peripheral device, such detection signal parameter memory 13 can be omitted.

INDUSTRIAL APPLICABILITY

As described above, if the process which decides whether or not values of the device information are in the range indicated by the range information and then outputs this decision result to the output unit is applied to a plurality of output units, the servo system controller according to the present invention can be applied to any servo system controller and thus the tact time can be reduced without the large increase of the cost.

Also, the range information can be easily changed every working object.

Further, for example, in the case that the increase and the variation of the decision process time have the influence upon the machining precision, e.g., the case where the cutter is started based on the decision result, there can be achieved such an advantage that the reduction in the machining precision can be prevented.

What is claimed is:

1. A servo system controller comprising:

a sequence controlling section comprising a device memory in which device information including output information, internal information, and input information indicating a state of a controlled object is stored, and a control memory for storing a sequence program in which variables indicating storing areas of the device information are described, wherein the controlled object is controlled via the output information by repeating an operation for updating the input information and an operation for updating the output information or the internal information based on the sequence program;

a positioning controlling section which accesses the device memory and executes a positioning control program based on a command from the sequence controlling section to output a predetermined position command, the positioning controlling section comprising a comparing process table memory in which the device information and range information are set previously in response to a plurality of output units respectively, wherein the positioning controlling section determines whether the device information is within a range indicated by the range information, and performs a process for outputting a decision result to the output units by referring to the comparing process table memory; and a servo controller for executing servo driving control of a predetermined motor based on the predetermined position command.

2. The servo system controller according to claim 1, wherein the positioning controlling section determines every execution period of the positioning control program whether a value of the device information is in a range indicated by the corresponding range information, and the process for outputting the decision result to the output units is performed for the plurality of output units.

3. The servo system controller according to claim 1, wherein the device memory includes an area for storing the range information, the sequence controlling section executes the sequence program in which variables indicating an area which stores the range information are described, and the positioning controlling section obtains the range of information from this area at a time of execution of the positioning control program.

4. The servo system controller according to claim 1, wherein a plurality of pieces of range information are set previously for one output unit, and the positioning controlling section determines whether or not a value of corresponding device information is in a range indicated by the plurality of pieces of range information.

5. The servo system controller according to claim 2, wherein a plurality of pieces of range information are set previously for one output unit, and the positioning controlling section determines whether or not a value of corresponding device information is in a range indicated by the plurality of pieces of range information.

6. The servo system controller according to claim 3, wherein a plurality of pieces of range information are set previously for one output unit, and the positioning controlling section determines whether or not a value of corresponding device information is in range indicated by the plurality of pieces of range information.

* * * * *